United States Patent [19]

Zöllner

[11] Patent Number: 4,602,791
[45] Date of Patent: Jul. 29, 1986

[54] HIGH PRESSURE SEAL ASSEMBLY

[75] Inventor: J. Peter Zöllner, Glinde, Fed. Rep. of Germany

[73] Assignee: Bran & Lübbe GmbH, Norderstedt, Fed. Rep. of Germany

[21] Appl. No.: 703,212

[22] Filed: Feb. 15, 1985

[30] Foreign Application Priority Data

Feb. 15, 1984 [DE] Fed. Rep. of Germany ....... 3405351

[51] Int. Cl.$^4$ ............................................. F16J 15/24
[52] U.S. Cl. .................. 277/188 R; 277/138; 277/188 A
[58] Field of Search ............... 277/138, 139, 140, 141, 277/142, 188 R, 188 A, 216, 3, 27

[56] References Cited

U.S. PATENT DOCUMENTS

| 2,509,436 | 5/1950 | Isenbarger. | |
|---|---|---|---|
| 3,094,337 | 6/1963 | Pippert et al. | 277/188 A |
| 3,186,702 | 6/1965 | Taylor | 277/188 A X |
| 3,366,392 | 1/1968 | Kennel | 277/188 R X |
| 3,525,530 | 8/1970 | Bauer et al. | 277/188 R X |

FOREIGN PATENT DOCUMENTS

| 2007155 | 1/1970 | France. | |
|---|---|---|---|
| 692036 | 5/1953 | United Kingdom | 277/188 R |
| 729306 | 5/1955 | United Kingdom | 277/188 R |
| 1085280 | 9/1967 | United Kingdom | 277/188 A |
| 718655 | 2/1980 | U.S.S.R. | 277/188 R |

Primary Examiner—Robert S. Ward
Attorney, Agent, or Firm—Michael J. Striker

[57] ABSTRACT

A seal assembly for sealing two relatively movable parts against fluid leakage comprises a seal ring of compressible material mounted on one of the parts, and a supporting ring of non-compressible material positioned in an axial annular groove in said seal ring, said groove being open towards the annular gap to be sealed and surrounded by an annular web, said supporting ring being arranged to be radially displaceable in that groove with limited elastic deformation of said annular web.

6 Claims, 8 Drawing Figures

HIGH PRESSURE SEAL ASSEMBLY

BACKGROUND OF THE INVENTION

The present invention relates to a high pressure seal assembly utilized to seal relatively movable parts against each other to prevent leakage of fluid therebetween. More particularly, the invention relates to a high pressure seal assembly for axially displaceable and/or rotatable pistons, piston rods, shafts or the like, by means of at least one seal or guide ring formed of a material which is elastically or plastically deformable under pressure, and a supporting ring positioned on said guide ring.

Known high pressure seal assemblies include a rigidly mounted supporting ring of a material which is practically non-deformable under operational conditions, which supporting ring supports and lodges a seal made of a material which is elastically or plastically deformable under pressure. Such materials can be elastomers, PTFE-impregnated plastic or mineral fiber fabrics and/or compounds or similar block-type packings in the form of grooved rings, squared cords, striplike rings, etc. A guide ring provided together with the seal or in place of the seal and made of material deformable under pressure has served the purpose of supporting the seal and/or guiding the plunger piston, piston rod, piston or shaft or the like and had to be also supported an lodged. The supporting ring therefore is rididly mounted at the low pressure side of the seal. An annular play or gap is formed between the relatively movable parts. If this play were selected so great that the lateral contact of these parts relative to each other and a resulting damaging of sliding surfaces would be avoided, then the deformable seal or guide ring would be extruded under operating pressure into the annular play and the seal under operating condition would be sooner or later damaged. If, on the other hand, the annular play were so small so that the extrusion of the deformable seal or guide ring into the annular play would not be possible the parts would tend to contact each other due to unavoidable radial deflections, which would lead to damaging of sliding surfaces.

SUMMARY OF THE INVENTION

It is an object of the present invention to provide an improved high pressure seal assembly.

It is another object of the present invention to provide a high pressure seal assembly which would have an extended service life and would be inexpensive to make.

These and other objects of the invention are attained by a high pressure seal assembly for sealing parts guided for axial telescoping movement and/or rotation, like a piston, a piston rod, a shaft and the like, comprising at least one seal ring of a material elastically or plastically deformable under pressure and having an axial annular groove which opens to an annular play to be sealed and is defined by a substantially radial annular surface and an axial annular web surrounding said annular groove on that side turned away from said annular play, and a supporting ring positioned in said groove against said radial surface, said supporting ring being in the assembled state supported against an annular seal seat, said supporting ring being formed of a hard material substantially not deformed under the operating conditions and having a peripheral surface facing said annular play, said seal ring having a peripheral surface adapted to slidingly abut in operation against an opposed part, said peripheral surface of the supporting ring being slightly set radially back relative to said peripheral surface of said seal ring, and said supporting ring in an assembled position protruding radially beyond said seal seat with formation of a narrow annular play to said opposed part, said supporting ring having a peripheral surface turned away from said annular play and abutting against said annular web of the sealing ring, said supporting ring in operating conditions being radially elastically displaceable in said annular web with limited deformation thereof.

The supporting ring may be formed of metal having emergency sliding properties or of oxide ceramic.

The supporting ring in accordance with the present invention is positioned in the annular groove of the seal ring and is radially displaceable therein with limited deformation of said web. The annular play between the supportin ring and the other part of the assembly to be sealed is selected to be so small that the extrusion of the seal ring into the annular gap is prevented. On the other hand, the damaging of the sliding surfaces of the supporting ring and the piston rod or shaft due to lateral displacements is avoided because the supporting ring is not rigidly mounted but can rather radially float. With a suitable combination of materials of the seal ring, the supporting ring and the outer surface of the piston or shaft a calibration of the supporting ring due to a minor concentric radial compression of this ring under the high operating pressure is possible so that the annular play would practically disappear.

The supporting ring can be positioned so that a small annular play would result between the axial annular web of the seal ring and the outer surface of the supporting ring so that alignement errors between the supporting ring and the piston or shaft would be compensated and the supporting ring would be surrounded by said web.

The annular web has a peripheral surface facing said annular play, said peripheral surface may have before assembling a diameter adapted to leave a predetermined small distance to the opposite peripheral surface of the supporting ring, but in operational condition, said peripheral surface of the annular web abuts against said opposite peripheral surface under elastic and/or plastic deformation.

The seal assembly may further include a block-type packing ring, said seal ring having an end face facing away from said annular groove and being formed at said end face with a substantially V-shaped groove which receives said packing ring.

The seal ring has a side facing away from said annular groove and may be formed at said side with at least one radial lip.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
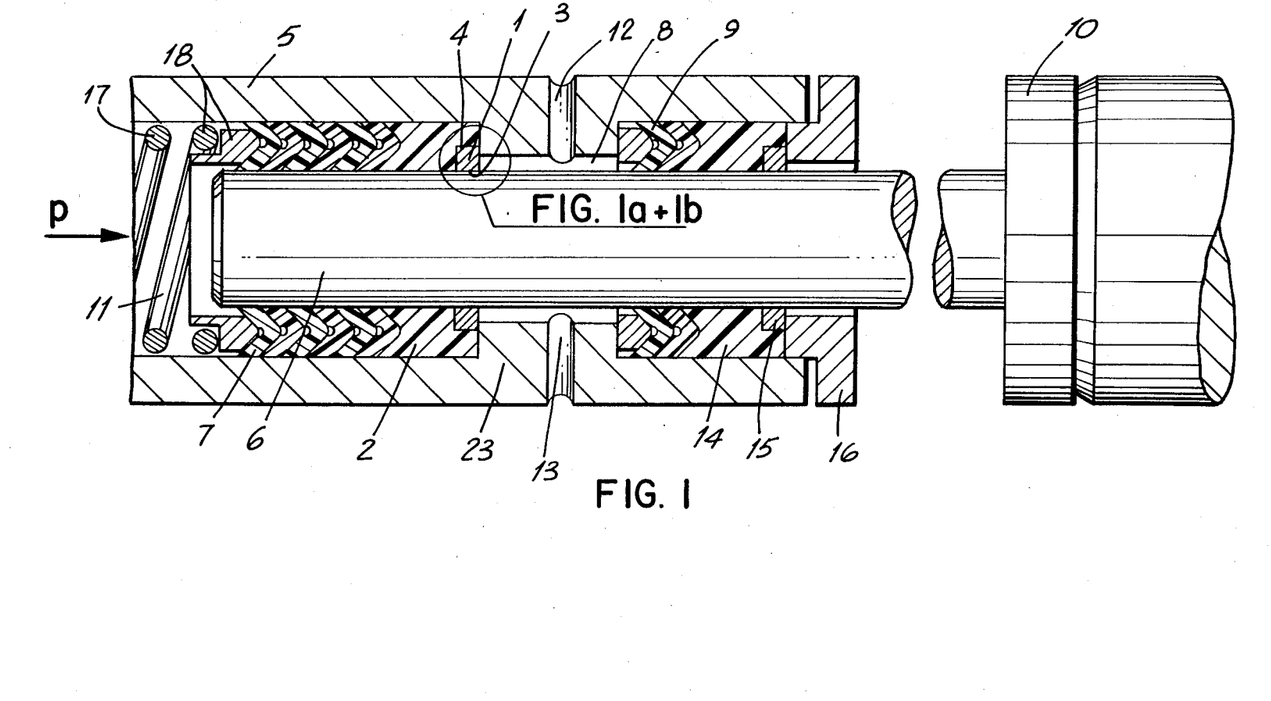
FIG. 1 is an axial view of a high pressure seal for a plunger piston.
Figure 1A:
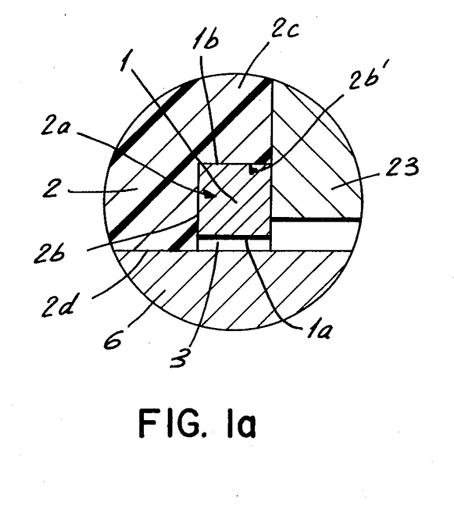
FIGS. 1a and 1b are enlarged views of detail A of FIG. 1, showing the supporting ring in different positions.
Figure 1B:
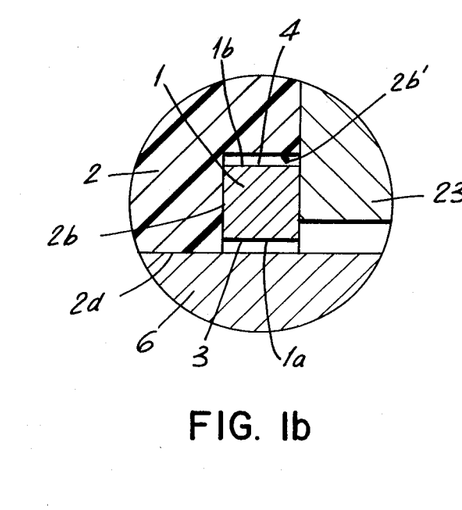

Referring now to the drawings in detail, and first to FIG. 1, 1a and 1b thereof it will be seen that a plunger piston 6 is surrounded by a high pressure seal which includes a seal ring 2 which at the end thereof, cooperating with a supporting ring 1, has an annular groove 2a, open to an annular gap 3 to be sealed. The annular groove 2a is defined by a substantially radially extended annular surface 2b and an axially extending annular web 2c on the side turned away from said gap 3.

In the exemplified embodiment the guide ring is formed of filled PTFE. A supporting ring 1 of sintered metal (DEVA-metal) is positioned in groove 2a so as to abut against the annular surface 2b. With coaxial alignment a peripheral surface 1a of ring 1, facing towards gap 3, is slightly set back relative to a peripheral surface 2d of seal ring 2, which is remote from the annular web 2c.

The peripheral surface 2b of annular web 2c, facing gap 3, corresponds in diameter to an outer peripheral surface 1b of supporting ring 1, as shown in FIG. 1a. The diameter of surface 2b' can, however, before assembly leave to the supporting ring a predetermined small radial play 4 (FIG. 1b), but in operating condition will abut with elastic and/or plastic deformation against said supporting ring. Thus, supporting ring 1 is positioned radially elastically displaceasble with limited deformation of annular web 2c in this manner.

The seal ring 2 has at its axial surface facing away from groove 2a, a groove for receiving block-type packing ring. 7. this groove has a V-shape cross-section.

The high pressure seal is received in a plunger sleeve 5 and seals the latter against displaceable piston 6. A pressure ring 18 surrounding piston 6 is urged by a spring arrangement 17 in the direction towards the high pressure seal 2 and presses this seal against a radially inwardly protruding seat 23 of the plunger sleeve 5, which seat extends radially in the direction towards piston 6 so that the side surface of the supporting ring 1, facing away from the pressure side abuts against seat 23. A ring-shaped maintainance chamber 8 is formed between seat 23 and piston 6. Chamber 8 is provided with a feeding passage 12 and a discharge passage 13, formed as radial bores, and serves the purpose of lubricating and/or cooling of the piston 6. At the low pressure side of seat 23 is provided a second high pressure seal which includes a block-type packing ring 9, a seal ring 14 and a supporting ring 15 and is clamped against seat 23 by a holding element 16 fixed in sleeve 5. The seal ring 14 and the supporting ring 15 correspond in their constructions to seal ring 2 and supporting ring 1, respectively. Both high pressure seals act in the same direction.

Piston 6 is connected via a coupling 10 with a crosshead of a conventional crank drive (not shown) and is reciprocally displaceable in a feeding chamber 11 closed by the high pressure seal. During the piston feeding stroke (the movement in the leftward direction in FIG. 1) the piston generates in feeding chamber 11 a feeding pressure which is indicated by arrow P. Under this pressure the high pressure seal, urged by the spring 17 and pressure ring 18 against seat 23, is further compressed. The V-shaped groove 2e of the seal ring 2 prevents the packing ring 7 from being excessively deformed. The seal ring 2 can not be extruded under high pressure into a very small annular gap 3 between supporting ring 1 and piston 3 and presses the ring 1 against seat 23 of sleeve 5. Due to the pressure the extrusion of the seal ring 2 between supporting ring 1 and seat 23 is prevented. Due to the radially inwardly directed pressure of seal ring 2 on the outer periphery of supporting ring 1 the latter will be always minimally radially compressed. This will not cause friction damages of the outer surface of piston 6 or the inner periphery of supporting ring 1 because the supporting ring 1 can radially give way with deformation of annular web 2c so that allowable surface pressure values upon contacting of the slide surfaces would not be exceeded.

Figure 2:
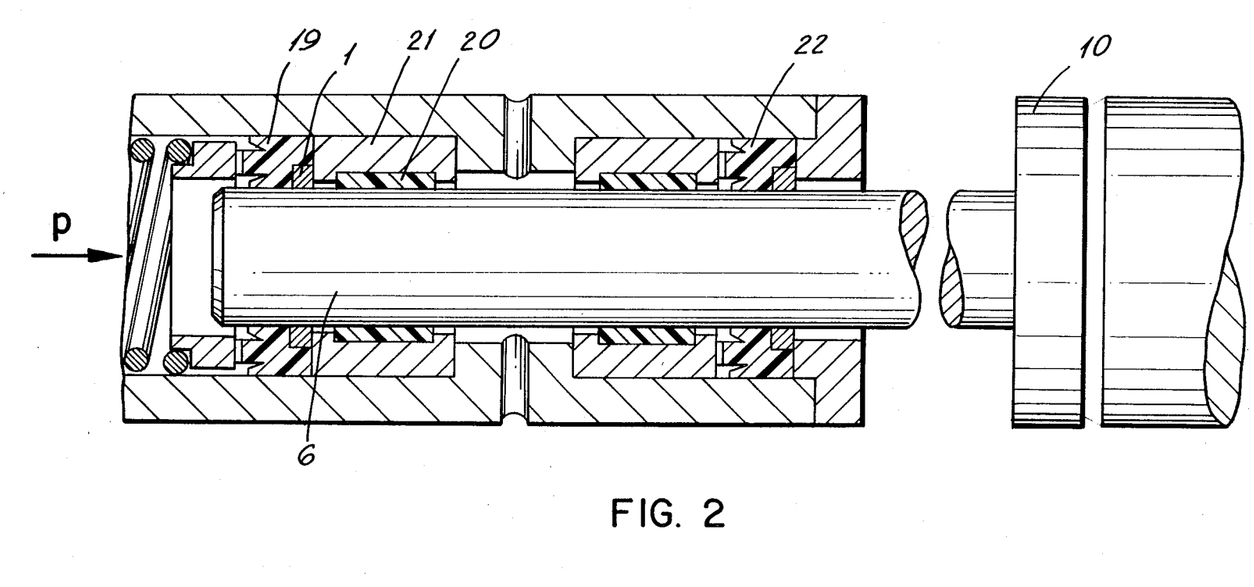
FIG. 2 is an axial view of a high pressure seal of a modified embodiment, for a plunger piston.

FIG. 2 illustrates a modified embodiment of the high pressure seal for a plunger piston. In this embodiment the high pressure seal includes a supporting ring 1 substantially corresponding to supporting ring 1 of FIGS. 1, 1a, 1b. This supporting ring is positioned in a groove formed in a seal ring 19. Supporting ring 1 is radially displaceable in seal ring 19 in the same manner as that described for the embodiment of FIG. 1. The seal ring 19 has at the axial end surface thereof facing away from the groove receiving said supporting ring 1 radial sealing lips which produce against the plunger sleeve wall or the plunger piston 6 the above described sealing action corresponding to the sealing action of the packing ring. The seal ring 19 and the supporting ring 1 do not press directly against the sleeve but rather against a seat on a rigid holding ring 21 made of a material which is not deformable under operating conditions. Holding ring 21 defines with the plunger piston 6 such a great radial play that piston 6 can not come into contct with holding ring 21.

A further guide ring 20 formed of elastic and/or plastically deformable material is inserted in the holding element 21 for guiding plunger piston 6 in the inner surface of holding ring 21. Since a high pressure seal formed of seal ring 19 and supporting ring 1 is arranged at the pressure side before the guide ring 20 the latter does not need to be secured against deformation under pressure in the same manner as in the arrangement of FIG. 1. At the low pressure side of the seat are provided a seal ring 22 with radially extending sealing lips and a further supporting ring supported in the respective groove of seal ring 22 similary to the seal ring 19. The second high pressure seal including seal ring 22 and the respective supporting ring is clamped against the seat of the plunger sleeve by a holding ring 22a abutting against the righthand face of seal ring 22 and its supporting ring.

In the above described embodiments the high pressure seal has been used in constructions, in which the inner part is movable and sealed whereas the high pressure seal has been arranged on the stationary housing. However the high pressure seal can also be mounted on the movable one of the two parts. Such an arrangement will be described herein below with reference to FIGS. 3 and 4.

Figure 3:
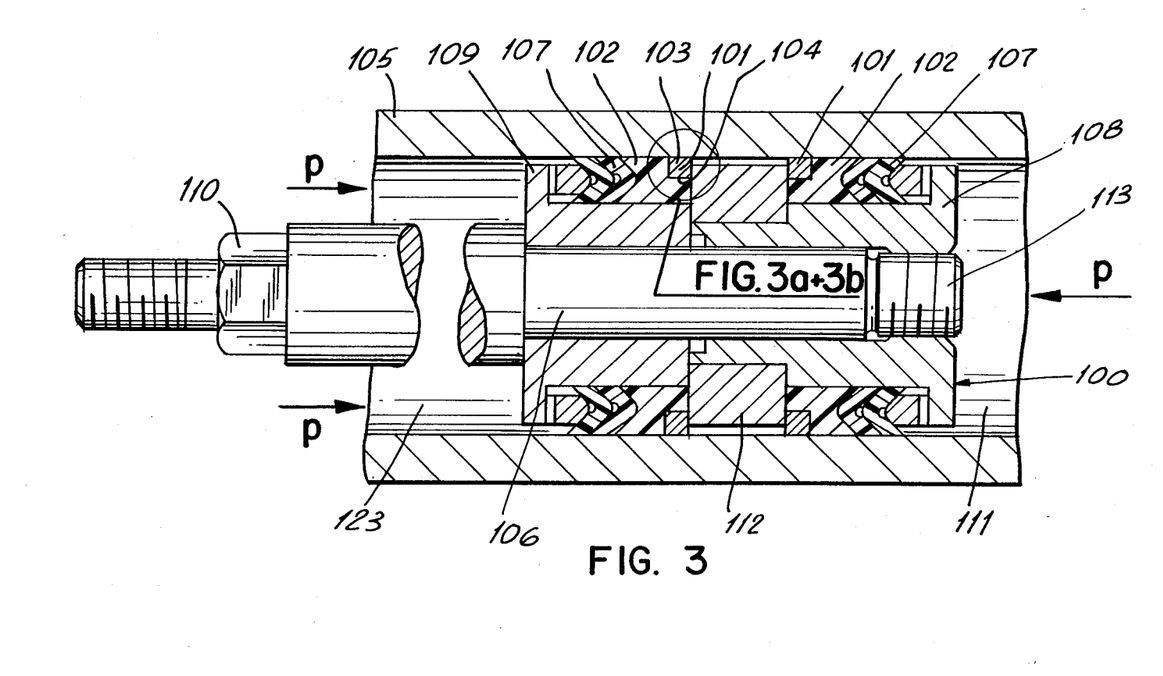
FIG. 3 is an axial view of a high pressure seal for a piston.
Figure 3A:
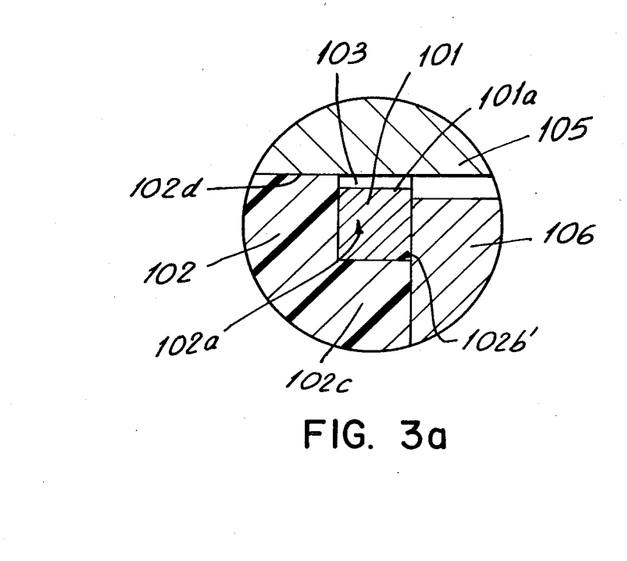
FIGS. 3a and 3b are enlarged views of detail B of FIG. 3 showing the supporting ring in different positions.
Figure 3B:
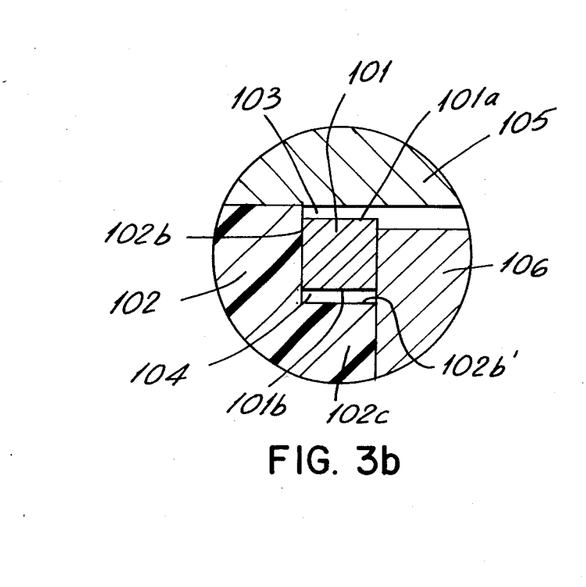

FIG. 3 illustrates a cylinder 105 in which a reciprocally movable piston 100, displaced by a piston rod 106, is positioned. Piston 100 slides along the inner wall of cylinder 105, which wall is sealed against the piston 100 by the high pressure seal according to the invention. The high pressure seal includes a seal ring 102 (FIGS. 3a, 3b), in an annular groove 102a of which a supporting ring 101 is positioned. The annular groove 102a is open towards the axial end of seal ring 102, towards the annular gap 103 to be sealed. The annular groove 102a is defined by a substantially radial annular surface 102b and by an axially extending annular web 102c provided at the side facing away from gap 103. With coaxial alignment a peripheral surface 101a of supporting ring 101, facing the annular gap 103, is set back by a small amount relative to that peripheral surface 102d of guide ring 102 remote from annular web 102c. As shown in FIGS. 3a and 3b the peripheral surface 102b' of annular web 102c corresponds in diameter to the inner peripheral surface 101b of supporting ring 101, or before assembly, may be greater by a predetermined small radial play 104, but in each case in operating condition the surface 102b with elastic and/or plastic deformation abuts the peripheral surface 101b of said supporting ring 101. Also in this embodiment the supporting ring 101 lying in the groove 102 against step-like annular surface 102b, is with limited deformation of web 102c radially elastically displacable. Materials utilized for making the seal ring 102 and the supporting ring 101 correspond to those employed for the embodiment of FIGS. 1 and 2.

The seal ring 102 has at its end face, facing away from annular groove 102a, a groove 107a for receiving a block-type packing ring 107. Groove 107a has a V-shaped cross section. Piston 100 has two piston segments 108, 109 which are mounted on the end portion of piston rod 106 by a fastening element 113 and are clamped in position by an intermediate ring 112. The outer diameters of piston segments 108, 109, and the intermediate ring 112 are smaller than the inner diameter of cylinder 105 so that in operation upon small radial deflections of the piston the piston segments 108, 109 and the intermediate ring 112 cannot come into contact with the inner surface of cylinder 105.

The high pressure seal is mounted between each piston segment 108 or 109 and intermediate ring 112 such that each supporting ring 101 abuts against a seat on the intermediate ring 112 and both high pressure seals, upon tightening of the fastening element 113 are pressed by the movement of piston segments 108, 109 towards each other from the opposite sides against the intermediate ring 112 and are thereby slightly compressed and prestressed. The high pressure seals act in the opposite directions.

The piston rod 106 is coupled via coupling 110 either with the crosshead of a commonly known crank drive or with a device for axial force transmission. In the first case pressure P will be generated in a feeding fluid flowing in the cylindrical chambers due to the reciprocal movement of piston 100 and a corresponding volume change in the cylindrical chambers. In the second case pressure would exert, for example due to the admission of a hydraulic medium into cylindrical chambers 111 or 123, on the piston 100 which would transmit this pressure by means of piston rod 106 to an actuating device.

Under operating pressure in cylinder chamber 111 or 123, which acts via packing ring 107 on seal ring 102 and supporting ring 101, the seal ring 102 is deformed and radially displacably guides the supporting ring 101. Any extrusion of the seal ring 102 into the space between the inner wall of cylinder 105 and the intermediate ring 112 is thus prevented due to the strong pressure of the supporting ring 101 against intermediate ring 112 and the minimal annular play 103.

Manufacturing and assembling alignment errors between the inner wall of cylinder 105 and the supporting ring 101 are compensated for by a radial displacement of supporting ring 101, which is specifically facilitated when the radial play 104, as shown in FIG. 36, between web 102c of guide ring 102 and supporting ring 101 is provided.

Figure 4:
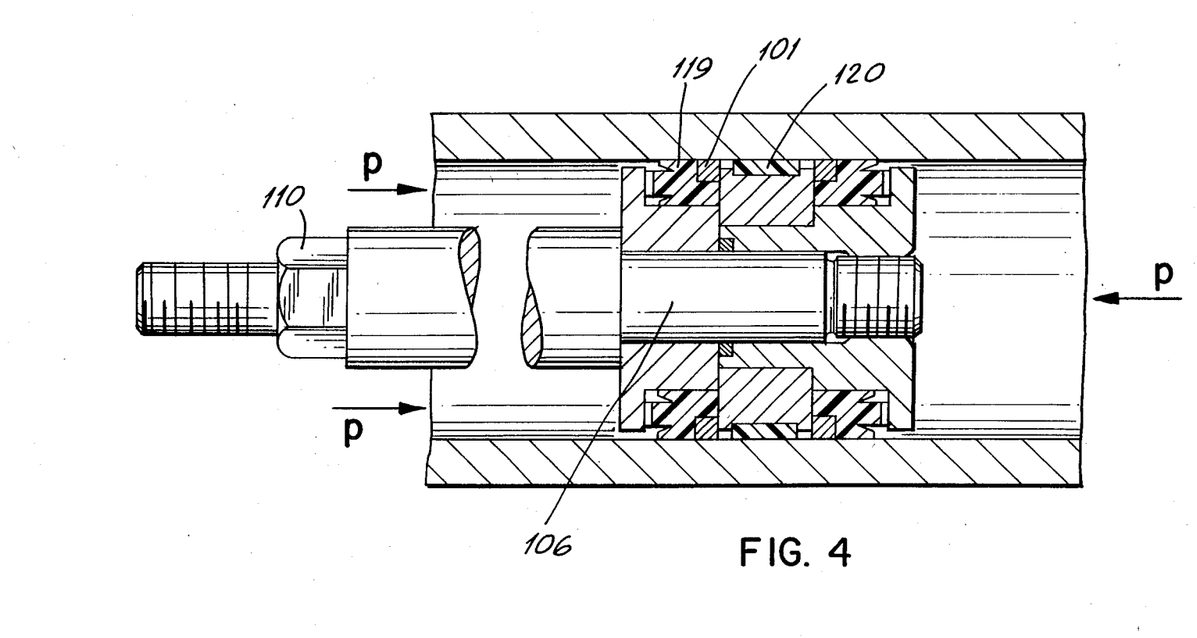
FIG. 4 is an axial view of a high pressure seal of a modified embodiment, for a piston.

FIG. 4 illustrates still another embodiment of the invention in which a deformable piston guide ring 120 is inserted in an outer peripheral surface of the intermediate ring. Similarly to the embodiment of FIG. 3 seal rings 119, in the annular grooves of which supporting rings 101 are disposed, are positioned between the two piston segments. The seal rings 119 have radial sealing lips which carry out the function of packing rings 107 of FIG. 3. Inasmuch as operational pressure P does not occur in the space enclosed between the inner wall of the cylinder and the supporting ring 101 the guide ring 120 must have no specific support and can simply be mounted in a recess of the peripheral surface of the intermediate ring. The function of the piston of FIG. 4 totally corresponds to the function of piston 100 of FIG. 3.

Tests have been conducted that compared the construction of FIG. 1 with conventional high pressure seals.

The packing rings utilized in the tests were made of four PTFE-impregnated asbestos-fabric packings. The plunger piston had a running surface coated with a chromium carbide layer MK 22 applied in a melting process. For the conventional high pressure seal there was used rigidly mounted supporting ring of AB 4-S brass having an inserted tape of filled PTFE (compound No. 10 of firm Busak & Luyken) as guide ring. A supporting ring of sintered metal with emergency sliding properties (DEVA-metal) and a guide ring of filled PTFE (compound No. 10 of firm Busak & Luyken) have been used in the seal according to the invention.

The running time until leakage occured in the conventional high pressure seal, was about 50 hours. The leakage was attributed to the supporting ring worn out by radial contact with the piston and subsequent breaking down of the block-type packing.

With the high pressure seal of the present invention no leakage occured even after 240 hours after which the block-type packings and the seal ring were still undamaged. The test after that running time was discontinued.

After 240 hours the supporting ring had shown slight touching-up traces uniformly distributed on the whole inner peripheral surface, which probably are due to the fact that the supporting ring is radially compressed during the pressure stroke and was calibrated by the hardened surface of the plunger piston. This assumption is supported by the fact that the inner diameter of the supporting ring has been increased by about 0.01 mm.

Besides the above described advantageous combination of the supporting ring with emergency sliding properties and the plunger piston with a much harder surfaces it is, of course, possible to use a supporting ring of material being as hard or harder than that of the surface of the piston, or the inner surface of which would have at least a correspondingly hard layer.

It will be understood that each of the elements described above, or two or more together, may also find a useful application in other types of high pressure seals differing from the types described above.

While the invention has been illustrated and described as embodied in a high pressure seal, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A high pressure seal assembly for sealing parts guided for axial telescoping movement and/or rotation like a piston, a piston rod, a shaft and the like, comprising at least one seal ring of a material elastically or plastically deformable under pressure and having an axial annular groove which opens to an annular play to be sealed and is defined by a substantially radial annular surface and an axial annular web surrounding said annular groove on that side turned away from said annular play and a supporting ring positioned in said groove against said radial surface, said supporting ring being in the assembled state supported against an annular seal seat provided, said supporting ring being formed of a hard material substantially not deformed under the operating conditions and having a peripheral surface facing said annular play, said seal ring having a peripheral surface adapted to slidingly abut in operation against an opposed part, said peripheral surface of the supporting ring being slightly set radially back relative to said peripheral surface of said seal ring, and said supporting ring in an assembled position protruding radially beyond said seal seat with formation of a narrow annular play to said opposed part, said supporting ring having a peripheral surface turned away from said annular play and abutting against said annular web of the seal ring, said supporting ring in operating conditions being radially elastically displaceable in said annular web with limited deformation thereof.

2. The seal assembly as defined in claim 1, wherein said supporting ring is formed of metal having emergency sliding properties.

3. The seal assembly as defined in claim 1, wherein said supporting ring is formed of oxide ceramic.

4. The assembly as defined in claim 1, said annular web having a peripheral surface facing said annular play, said peripheral surface having, before assembling, a diameter adapted to leave a predetermined small distance to the opposite peripheral surface of the supporting ring but in operational condition said peripheral surface of the annular web abuts against said opposite peripheral surface under elastic and/or plastic deformation.

5. The assembly as defined in claim 1, further including a block-type packing ring, said seal ring having an end face facing away from said annular groove and being formed at said end face with a substantially V-shaped groove which receives said packing ring.

6. The assembly as defined in claim 1, wherein said seal ring has a side facing away from said annular groove and is formed at said side with at least one radial lip.

* * * * *